(12) United States Patent
Pfister et al.

(10) Patent No.: US 6,832,297 B2
(45) Date of Patent: Dec. 14, 2004

(54) METHOD AND APPARATUS FOR MANAGING DATA IN A DISTRIBUTED BUFFER SYSTEM

(75) Inventors: Gregory Francis Pfister, Austin, TX (US); Renato John Recio, Austin, TX (US); Noshir Cavas Wadia, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 533 days.

(21) Appl. No.: 09/925,595

(22) Filed: Aug. 9, 2001

(65) Prior Publication Data

US 2003/0033487 A1 Feb. 13, 2003

(51) Int. Cl.[7] .................................................. G06F 13/00
(52) U.S. Cl. ........................ 711/144; 711/118; 711/119; 711/113; 711/141; 711/156; 709/200; 709/201; 709/216
(58) Field of Search ................................ 711/144, 118, 711/119, 141, 145, 156, 113; 709/201, 202, 200, 216

(56) References Cited

U.S. PATENT DOCUMENTS

| | | | | |
|---|---|---|---|---|
| 6,438,661 B1 | * | 8/2002 | Beardsley et al. | 711/144 |
| 6,560,681 B1 | * | 5/2003 | Wilson et al. | 711/144 |
| 6,654,769 B2 | * | 11/2003 | Ito et al. | 707/200 |
| 6,662,276 B2 | * | 12/2003 | Schoinas | 711/145 |
| 2001/0010068 A1 | * | 7/2001 | Michael et al. | 711/119 |
| 2002/0007439 A1 | * | 1/2002 | Gharachorloo et al. | 711/119 |
| 2002/0078292 A1 | * | 6/2002 | Chilton | 710/305 |
| 2002/0078304 A1 | * | 6/2002 | Masri et al. | 711/134 |
| 2002/0078305 A1 | * | 6/2002 | Khare et al. | 711/144 |

* cited by examiner

Primary Examiner—Mano Padmanabhan
Assistant Examiner—Jasmine Song
(74) Attorney, Agent, or Firm—Duke W. Yee; Mark E. McBurney; Lisa L. B. Yociss

(57) ABSTRACT

A method, apparatus, and computer implemented instructions for managing a plurality of caches of data, wherein the data processing system includes a plurality of independent computers. In response to initiating a read operation to read data on a data block, an indication is posted on a directory of data blocks identifying the computer that now holds a copy of that block and a location in the memory of that computer where a flag associated with that block is held. Then in response to initiating a write operation on that data block, messages are sent to all the computers holding that block which resets the said flag, thus informing each computer that the data in that block is no longer valid. These messages are sent using means that perform that flag reset without, in the preferred embodiment, any overhead of interruption of processing on the computers where the flags reside.

30 Claims, 12 Drawing Sheets

METHOD AND APPARATUS FOR MANAGING DATA IN A DISTRIBUTED BUFFER SYSTEM

BACKGROUND OF THE INVENTION

1. Technical Field

The present invention is directed to an improved data processing system. More specifically, the present invention is directed to an apparatus and method for maintaining the correctness of data that has been cached or locally copied in a distributed computing system having a number of separate computing nodes.

2. Description of Related Art

In a System Area Network (SAN), the hardware provides a message passing mechanism that can be used for Input/Output devices (I/O) and interposes communications (IPC) between general computing nodes. Processes executing on devices access SAN message passing hardware by posting send/receive messages to send/receive work queues on a SAN channel adapter (CA). These processes also are referred to as "consumers".

The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (Raw). Consumers retrieve the results of these messages from a completion queue (CQ) through SAN send and receive work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter (HCA) and a target channel adapter (TCA). The host channel adapter is used by general purpose computing nodes to access the SAN fabric. Consumers use SAN verbs to access host channel 1 adapter functions. The software that interprets verbs and directly accesses the channel adapter is known as the channel interface (CI).

Target channel adapters (TCA) are used by nodes that are the subject of messages sent from host channel adapters. The target channel adapters serve a similar function as that of the host channel adapters in providing the target node an access point to the SAN fabric.

The SAN channel adapter architecture explicitly provides for sending and receiving messages directly from application programs running under an operating system. No intervention by the operating system is required for an application program to post messages on send queues, post message receive buffers on receive queues, and detect completion of send or receive operations by polling of completion queues or detecting the event of an entry stored on a completion queue, e.g., via an interrupt. The SAN channel adapter architecture further provides for special messages known as atomic operations to be sent between end nodes. These special messages operate on the memory of the destination node to alter the content of the memory in a non-interruptible manner. These atomic operations include fetch-and-add, which atomically, i.e. non-interruptably, adds a number contained in the atomic operation message to the memory location and returns the prior content of the memory location.

These atomic operations further include a compare-and-swap operation which atomically compares the content of a memory location with a value contained in the atomic operation message. If the two values match, the content of the memory location is replaced with another value contained in the atomic operation message. These operations being atomic means that no other operation can intervene between their internal steps. Specifically, with fetch-and-add, a memory location is retrieved, a value is added to its content, and the result is stored. No other operation on that memory location can occur between the time the memory location is first retrieved and finally stored. Similarly, no other operation can occur on the memory location operated on by compare-and-swap between the time the location's value is initially copied from memory and another value is possibly (depending on the outcome of the comparison) stored in that memory location.

In the SAN architecture, the requirement that no other operation can intervene may be relaxed to reduce the cost of implementation. Instead, no other operations of several different classes may be allowed. Three cases are strong possibilities. First, no other operation done by the channel adapter performing the atomic operation can intervene, but other channel adapters or other host operations can intervene. Second, no other operation performed by any channel adapter can intervene, but other host operations can. Third, nothing on the system, whether the same channel adapter, another channel adapter, or a host, can intervene.

Therefore, it would be advantageous to have an improved method, apparatus, and computer implemented instructions for managing operations to access data in a distributed buffer system.

SUMMARY OF THE INVENTION

The present invention provides a method, apparatus, and computer implemented instructions for managing a plurality of caches of data, wherein the data processing system includes a plurality of independent computers. In response to initiating a read operation to read data on a data block, an indication is posted on a directory of data blocks identifying the computer that now holds a copy of that block and a location in the memory of that computer where a flag associated with that block is held. Then in response to initiating a write operation on that data block, messages are sent to all the computers holding that block which resets the said flag, thus informing each computer that the data in that block is no longer valid. These messages are sent using means that perform that flag reset without, in the preferred embodiment, any overhead of interruption of processing on the computers where the flags reside.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
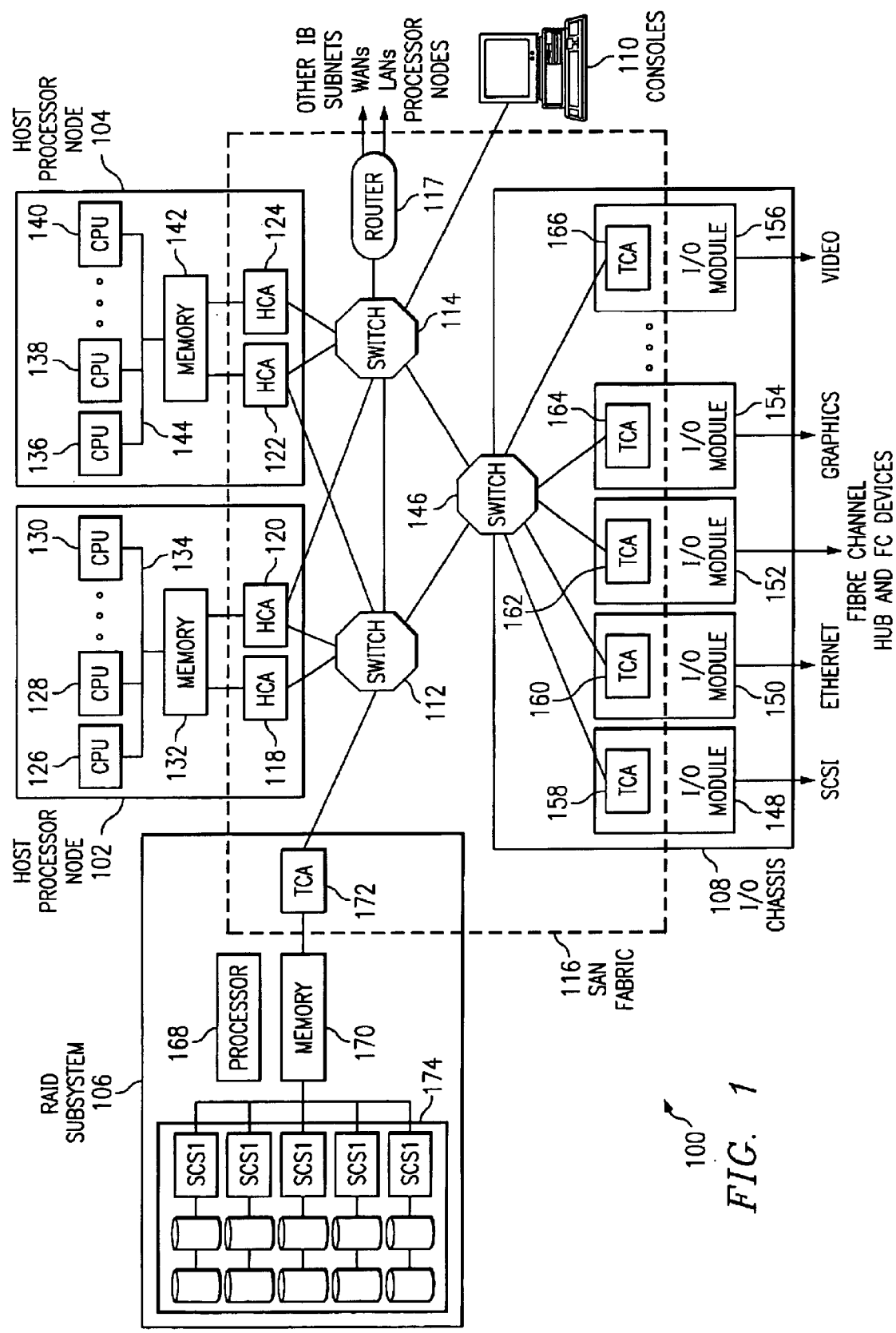
FIG. 1 is a diagram of a distributed computing system is illustrated in accordance with a preferred embodiment of the present invention.

The present invention minimizes the time and overhead involved in ensuring that local copies of data (cached data) are correct in a distributed system comprised of many separate computing nodes in which more than one of those nodes may alter the data.

Such distributed systems may come in many varieties; they include distributed databases, distributed file systems, distributed access methods, and other programs. Such distributed systems are often divided into two classes: Those that operate using shared secondary storage devices (e.g., disks) that all the nodes can access; and those that, by the conventional term, share nothing: secondary storage is always accessed by a single unique owner node, and if data from that storage is needed its unique owner is asked for the data. The present invention applies to both such classes of systems; the only constraint on its utility is that it is applicable only when multiple nodes can cache data that others can alter.

The use of cached data is crucially important to the performance of such systems, since it can dramatically reduce the time required to access such data for processing (reading or writing it); data which is already in a node's memory is clearly faster to access than data anywhere else (e.g., in another node's memory, or on a disk). However, cached data cannot be used unless it is known to be correct. If other nodes in a distributed computing system can change the data, the fact that it has changed must be communicated to all the nodes that have cached the data, so that they can avoid using out-of-date, incorrect, versions of the data. The problem is compounded by the fact that a node may not be actively using the data it has cached; that data may instead be stored because its space is not needed for something else, and it may be used in the future (speculative retention of data); so locks and other means of restricting access to the data are not in use. Such speculative retention has proven very effective in reducing the need to re-access data from its original source, since it has commonly been observed that many programs tend to reuse data that they have already used before.

The present invention best minimizes the time and overhead needed to inform other nodes that data is invalid by using capabilities available in SANs, including atomic operations and remote direct memory access (RDMA) (described below); however it is not necessarily limited to a SAN environment. It performs its function by having each node using the data maintain a validity flag in that node's own memory, and record for each block of cached data the location of that validity associated with locking structures for that block. Using that validity flag data, a different node wishing to change the data can reset the validity flags in nodes which cache the data. The informing of other nodes can be accomplished by SAN's RDMA or atomic operations without requiring any interruption of processing by the caching nodes, which may be engaged in work having nothing to do with the data being invalidated. Indeed, since that data may be being retained speculatively, they might never have occasion to use it again.

FIG. 1 is a diagram of a distributed computing system in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an Internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an end node, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. End nodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114. In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 116 is coupled to wide area network (WAN) and/or local area network (LAN) connections to other hosts or other routers. The I/O chassis 108 in FIG. 1 includes an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
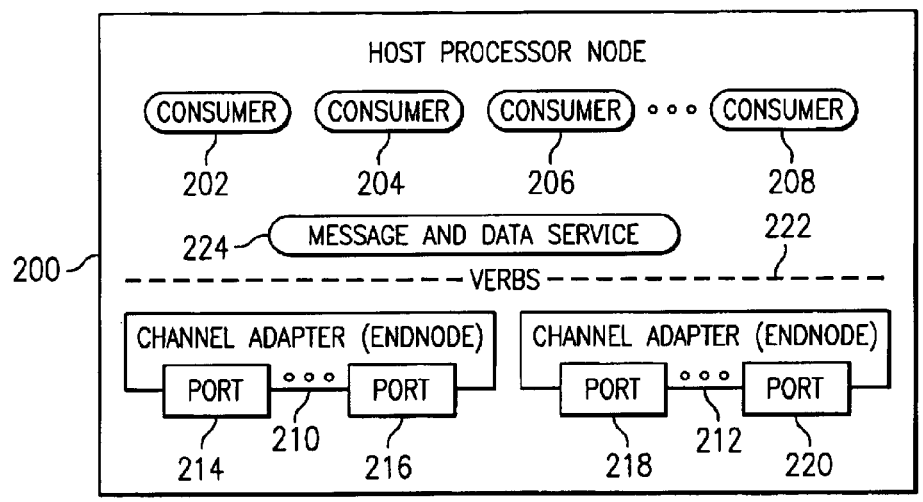
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1.

In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202–208 to process messages and other data.

Figure 3A:
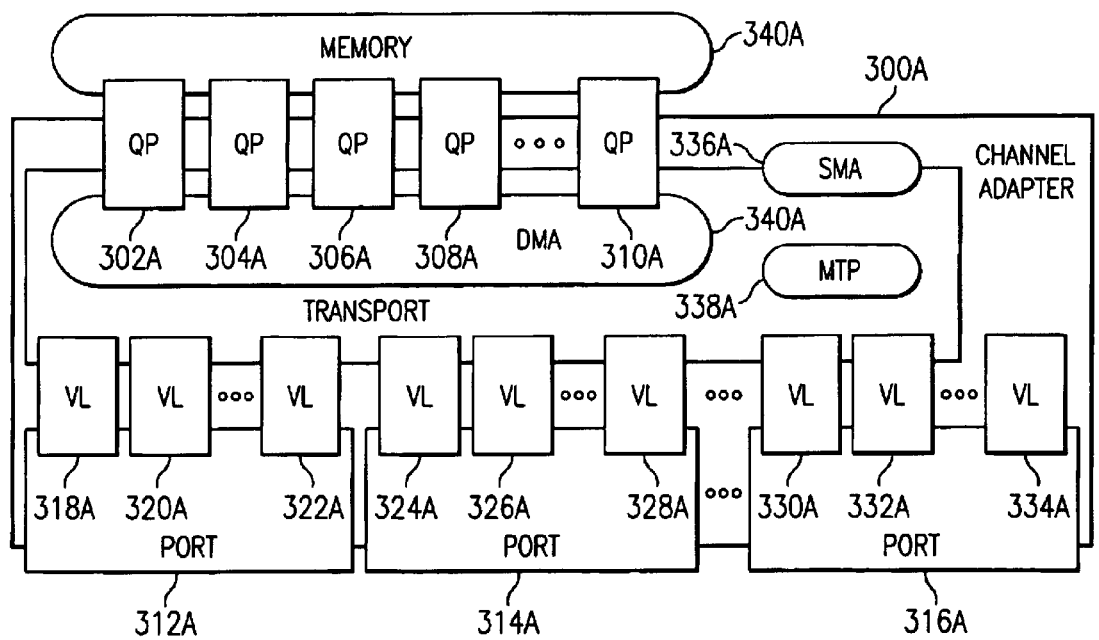
FIG. 3A is a diagram of a host channel adapter in accordance with a preferred embodiment of the present invention.

With reference now to FIG. 3A, a diagram of a host channel adapter is depicted in accordance with a preferred embodiment of the present invention. Host channel adapter 300A shown in FIG. 3A includes a set of queue pairs (QPs) 302A–310A, which are used to transfer messages to the host channel adapter ports 312A–316A. Buffering of data to host channel adapter ports 312A–316A is channeled through virtual lanes (VL) 318A–334A where each VL has its own flow control. Subnet manager configures channel adapters with the local addresses for each physical port, i.e., the port's LID.

Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 340A with respect to queue pairs 302A–310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 3B:
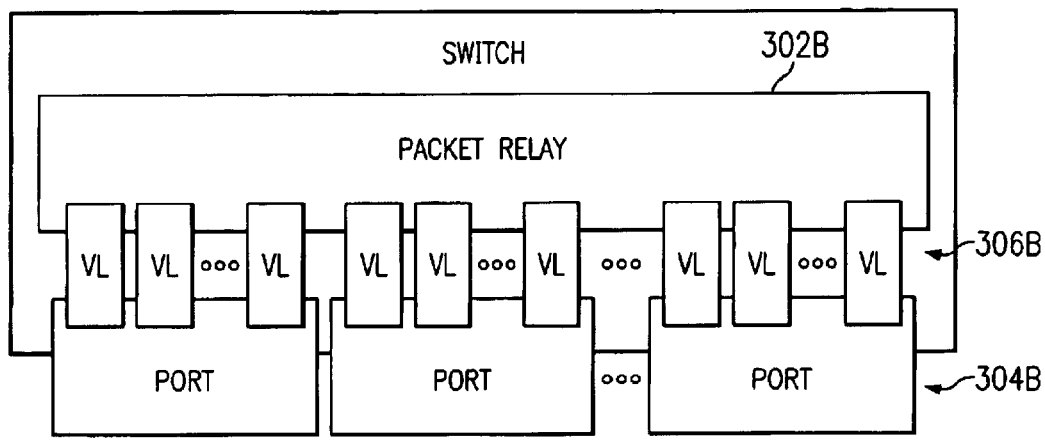
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
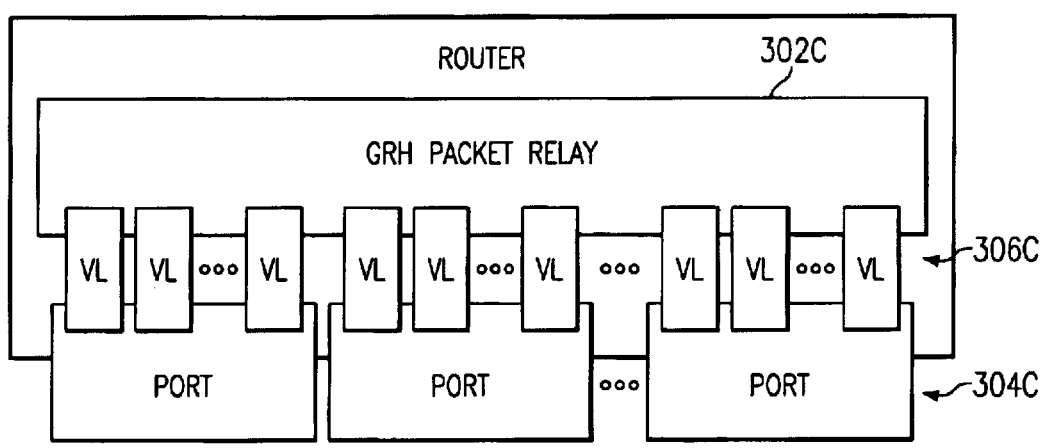
FIG. 3C is a diagram of a router in accordance with a preferred embodiment of the present invention.

Similarly, FIG. 3C depicts a router 300C according to a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect end nodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress.

Virtual lanes are employed for numerous reasons, some of which are as follows: Virtual lanes provide QoS. In one example embodiment, certain virtual lanes are reserved for high priority or isochroous traffic to provide QoS. Virtual lanes provide deadlock avoidance. Virtual lanes allow topologies that contain loops to send packets across all physical links and still be assured the loops won't cause back pressure dependencies that might result in deadlock. Virtual lanes alleviate head-of-line blocking. When a switch has no more credits available for packets that utilize a given virtual lane, packets utilizing a different virtual lane that has sufficient credits are allowed to make forward progress.

Figure 4:
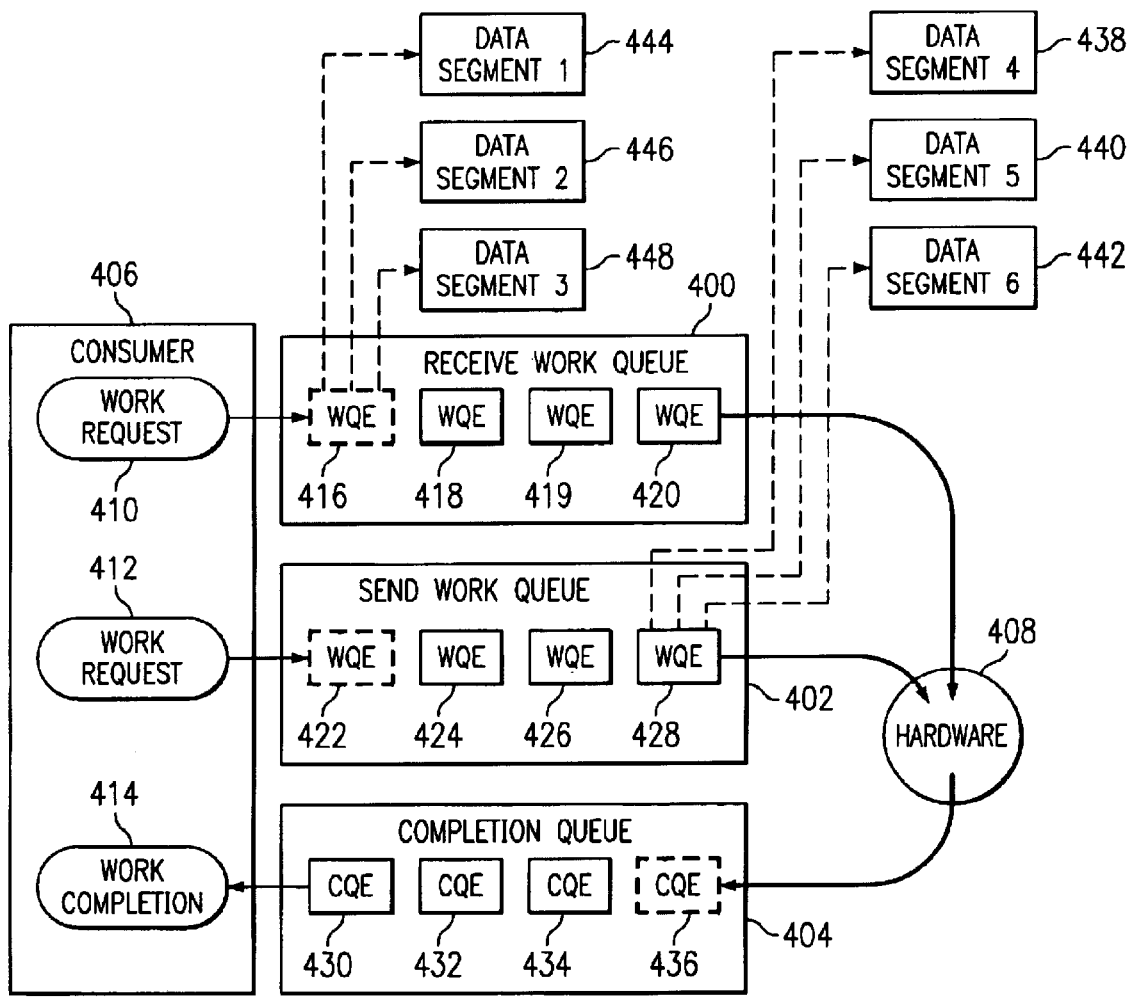
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services: reliable, unreliable, reliable datagram, and unreliable datagram connection service. Reliable and Unreliable connected services associate a local queue pair with one and only one remote queue pair. Connected services require a process to create a queue pair for each process that is to communicate with over the SAN fabric. Thus, if each of N host processor nodes contain P processes, and all P processes on each node wish to communicate with all the processes on all the other nodes, each host processor node requires $p^2 \times (N-1)$ queue pairs. Moreover, a process can connect a queue pair to another queue pair on the same host channel adapter.

Figure 5:
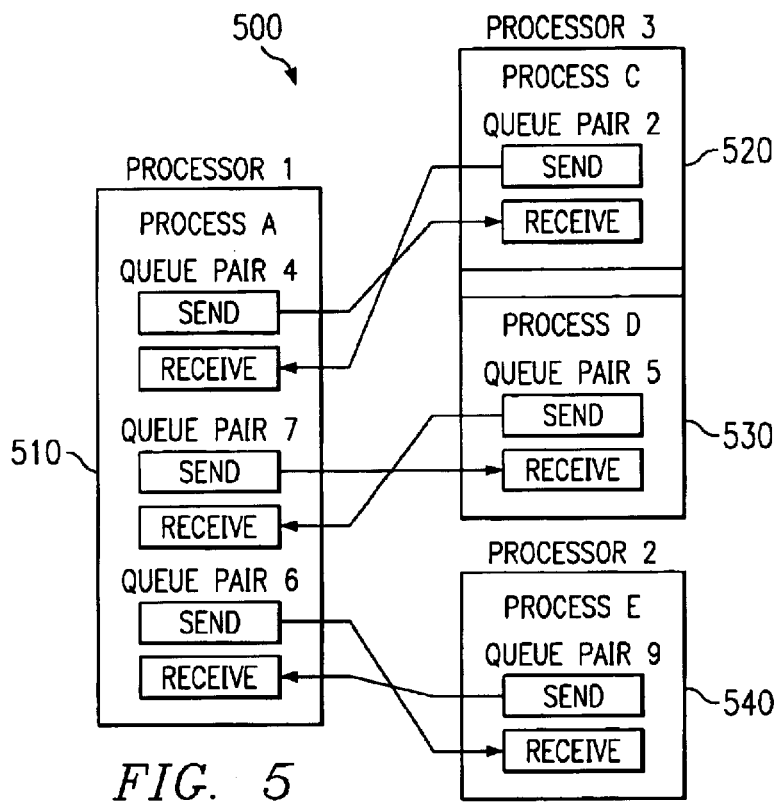
FIG. 5 is a diagram illustrating a portion of a distributed computer system in accordance with a preferred embodiment of the present invention in which a reliable connection service is used.

A portion of a distributed computer system employing a reliable connection service to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 2 includes a process C 520 and a process D 530. Host processor node 3 includes a process E 540.

Host processor node 1 includes queue pairs 4, 6 and 7, each having a send work queue and receive work queue. Host processor node 2 has a queue pair 9 and host processor node 3 has queue pairs 2 and 5. The reliable connection service of distributed computer system 500 associates a local queue pair with one an only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one embodiment of the present invention, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive underruns, and network congestion. If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Reliable datagram service associates a local end-to-end (EE) context with one and only one remote end-to-end context. The reliable datagram service permits a client process of one queue pair to communicate with any other queue pair on any other remote node. At a receive work queue, the reliable datagram service permits incoming messages from any send work queue on any other remote node.

The reliable datagram service greatly improves scalability because the reliable datagram service is connectionless. Therefore, an endnode with a fixed number of queue pairs can communicate with far more processes and end nodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N−1) EE contexts on each node for exactly the same communications.

Figure 6:
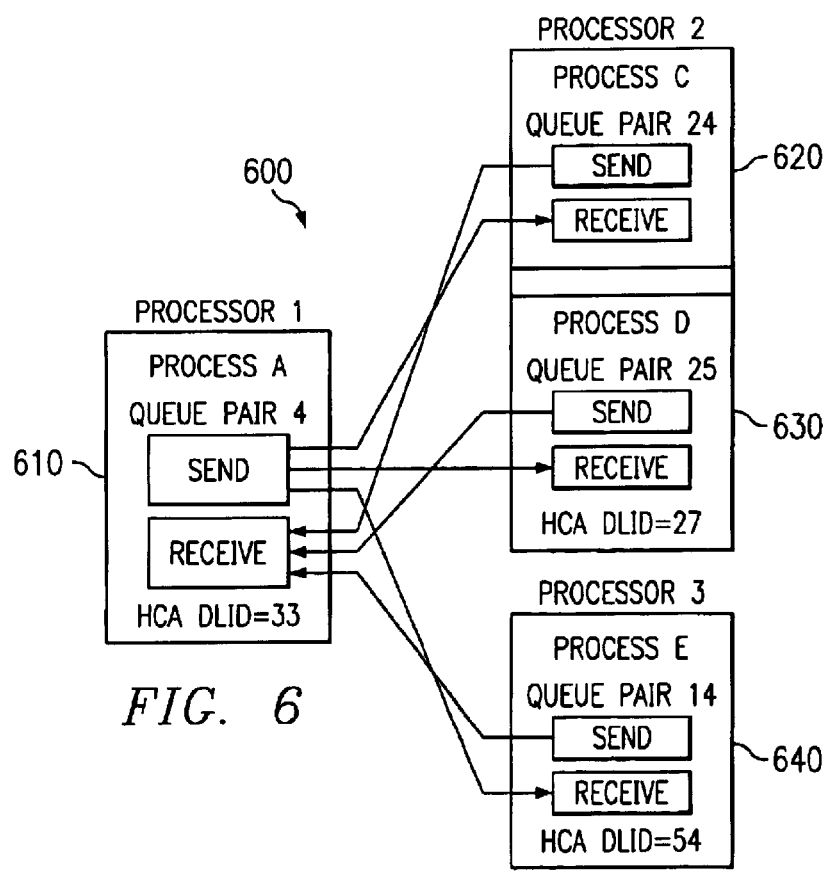
FIG. 6 is a diagram illustrating a portion of a distributed computer system in accordance with a preferred embodiment of the present invention in which reliable datagram service connections are used.

A portion of a distributed computer system employing a reliable datagram service to communicate between distributed processes is illustrated in FIG. 6. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one embodiment of the present invention, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless queue pairs communication between a pair of end nodes. Each endnode requires at least one EE context for every endnode it wishes to communicate with in the reliable datagram service (e.g., a given endnode requires at least N EE contexts to be able to have reliable datagram service with N other end nodes).

The unreliable datagram service is connectionless. The unreliable datagram service is employed by management applications to discover and integrate new switches, routers, and end nodes into a given distributed computer system. The unreliable datagram service does not provide the reliability guarantees of the reliable connection service and the reliable datagram service. The unreliable datagram service accordingly operates with less state information maintained at each endnode.

Figure 7:
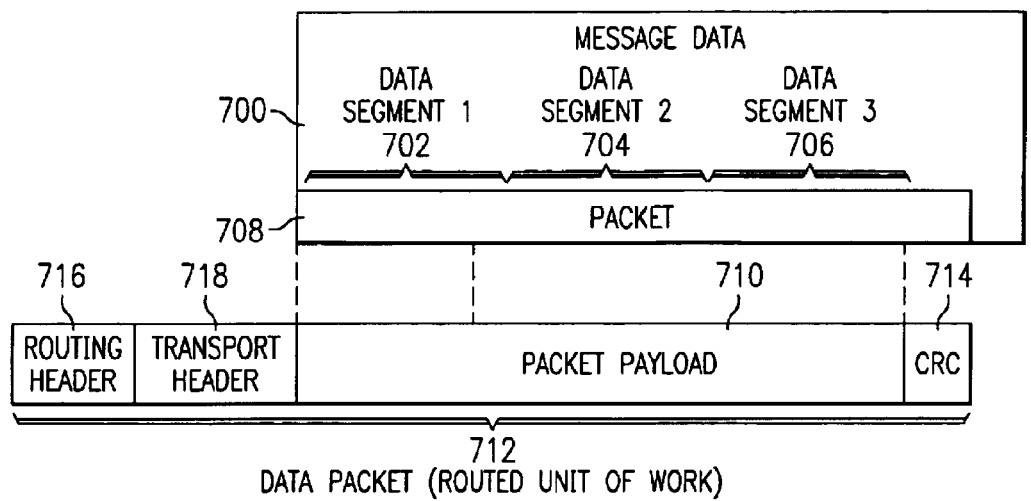
FIG. 7 is an illustration of a data packet in accordance with a preferred embodiment of the present invention.

Turning next to FIG. 7, an illustration of a data packet is depicted in accordance with a preferred embodiment of the present invention. A data packet is a unit of information that is routed through the SAN fabric. The data packet is an end node-to-end node construct, and is thus created and consumed by end nodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 1 702, data segment 2 704, and data segment 3 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an endnode may be configured to be members of one or more possibly overlapping sets called partitions.

Figure 8:
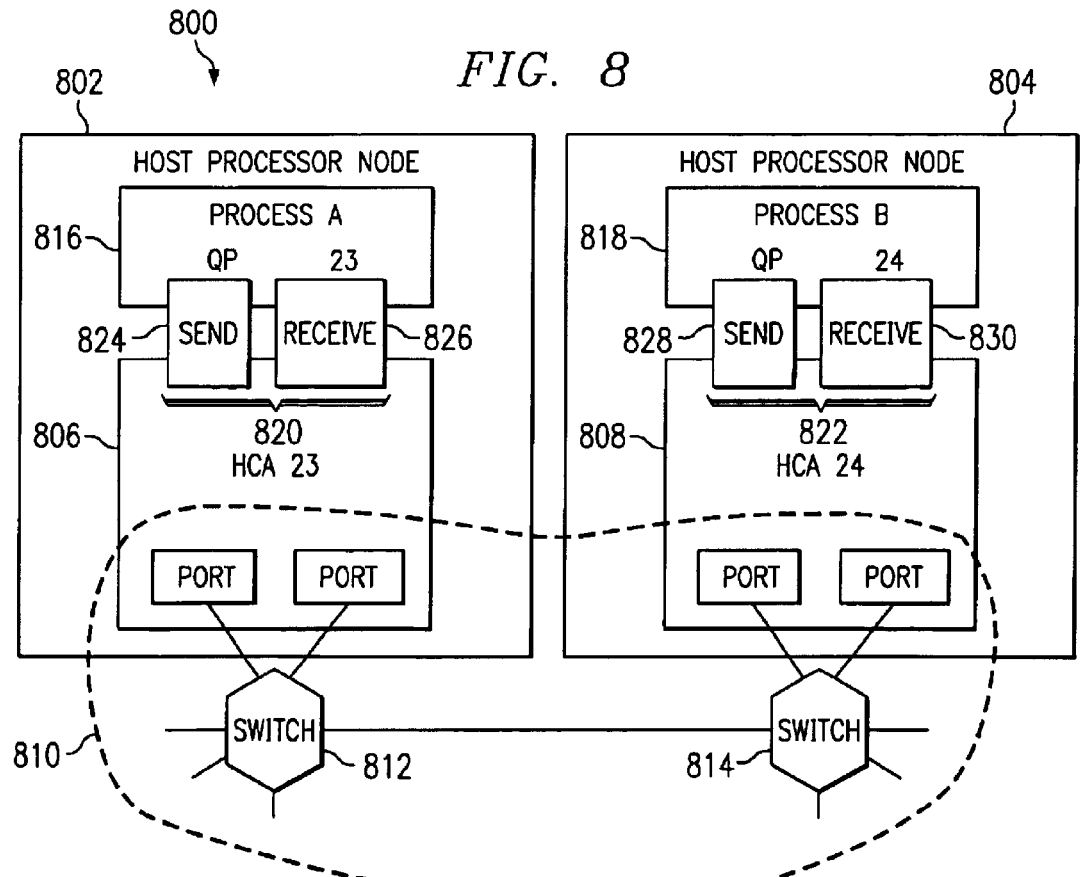
FIG. 8 is a diagram illustrating a portion of a distributed computer system in accordance with a preferred embodiment of the present invention.

In FIG. 8, a portion of a distributed computer system is depicted to illustrate an example request and acknowledgment transaction. The distributed computer system in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric 810, which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A. Host processor node 804 includes a client process B. Client process A interacts with host channel adapter hardware 806 through queue pair 824. Client process B interacts with hardware channel adapter hardware 808 through queue pair 828. Queue pairs 824 and 828 are data structures that include a send work queue and a receive work queue.

Process A initiates a message request by posting work queue elements to the send queue of queue pair 824. Such a work queue element is illustrated in FIG. 4. The message request of client process A is referenced by a gather list contained in the send work queue element. Each data segment in the gather list points to a virtually contiguous local memory region, which contains a part of the message, such as indicated by data segments 1, 2, and 3, which respectively hold message parts 1, 2, and 3, in FIG. 4.

Hardware in host channel adapter 806 reads the work queue element and segments the message stored in virtual contiguous buffers into data packets, such as the data packet illustrated in FIG. 7. Data packets are routed through the SAN fabric, and for reliable transfer services, are acknowledged by the final destination endnode. If not successively acknowledged, the data packet is retransmitted by the source endnode. Data packets are generated by source end nodes and consumed by destination end nodes.

Figure 9:
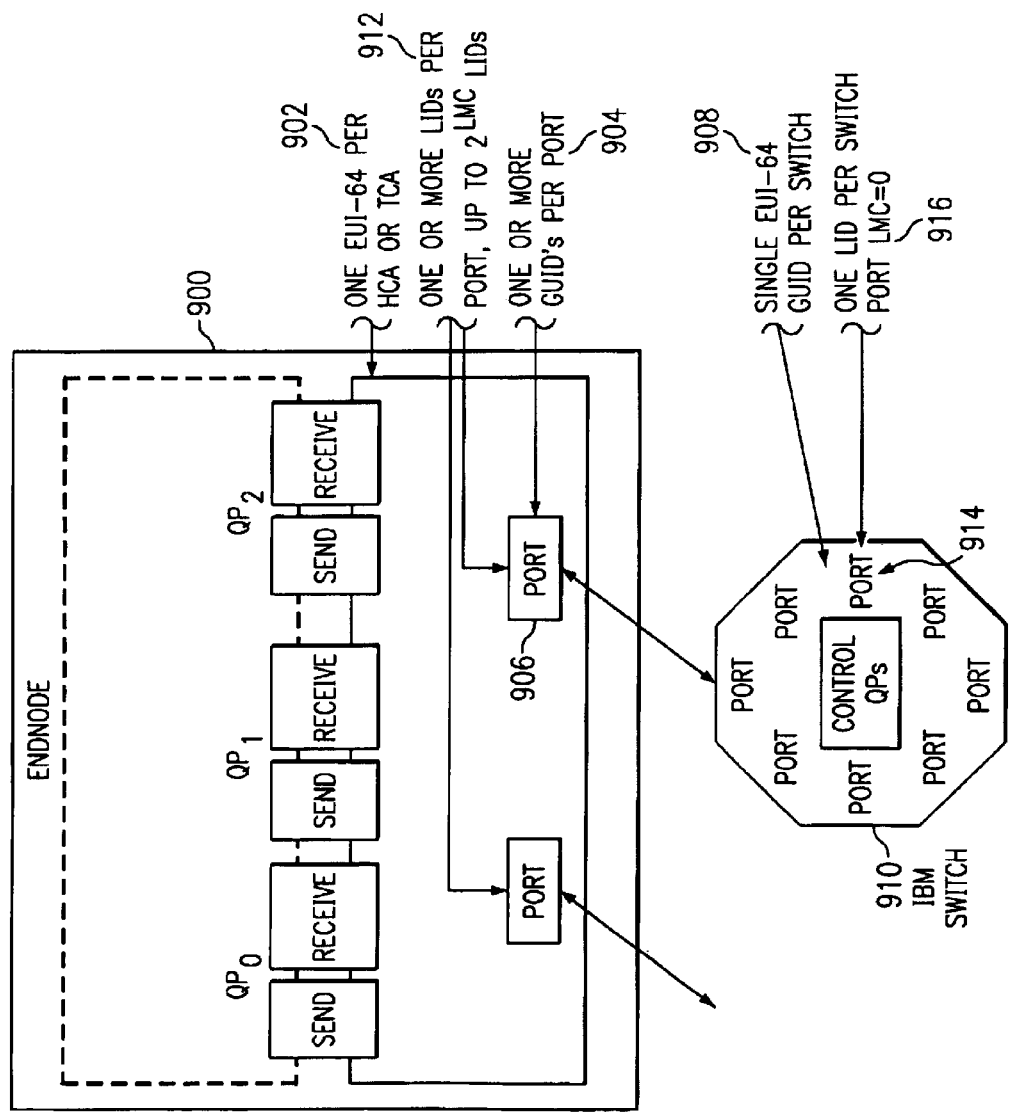
FIG. 9 is a diagram illustrating the network addressing used in a distributed networking system in accordance with the present invention.

In reference to FIG. 9, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on end node 900, which is specified by the host name. Thus, there is one host name per node, but a node can have multiple CAs.

A single IEEE assigned 64-bit identifier (EUI-64) 902 is assigned to each component. A component can be a switch, router, or CA. One or more globally unique ID (GUID) identifiers 904 are assigned per CA port 906. Multiple GUIDs (a.k.a. IP addresses) can be used for several reasons, some of which are illustrated by the following examples. In one embodiment, different IP addresses identify different partitions or services on an end node. In a different embodiment, different IP addresses are used to specify different Quality of Service (QoS) attributes. In yet another embodiment, different IP addresses identify different paths through intra-subnet routes. One GUID 908 is assigned to a switch 910.

A local ID (LID) refers to a short address ID used to identify a CA port within a single subnet. In one example embodiment, a subnet has up to $2^{16}$ end nodes, switches, and routers, and the LID is accordingly 16 bits. A source LID (SLID) and a destination LID (DLID) are the source and destination LIDs used in a local network header. A single CA port 1006 has up to $2^{LMC}$ LIDs 912 assigned to it. The LMC represents the LID Mask Control field in the CA. A mask is a pattern of bits used to accept or reject bit patterns in another set of data.

Multiple LIDs can be used for several reasons some of which are provided by the following examples. In one embodiment, different LIDs identify different partitions or services in an end node. In another embodiment, different LIDs are used to specify different QoS attributes. In yet a further embodiment, different LIDs specify different paths through the subnet. A single switch port 914 has one LID 916 associated with it.

A one-to-one correspondence does not necessarily exist between LIDs and GUIDs, because a CA can have more or less LIDs than GUIDs for each port. For CAs with redundant ports and redundant conductivity to multiple SAN fabrics, the CAs can, but are not required to, use the same LID and GUID on each of its ports.

Figure 10:
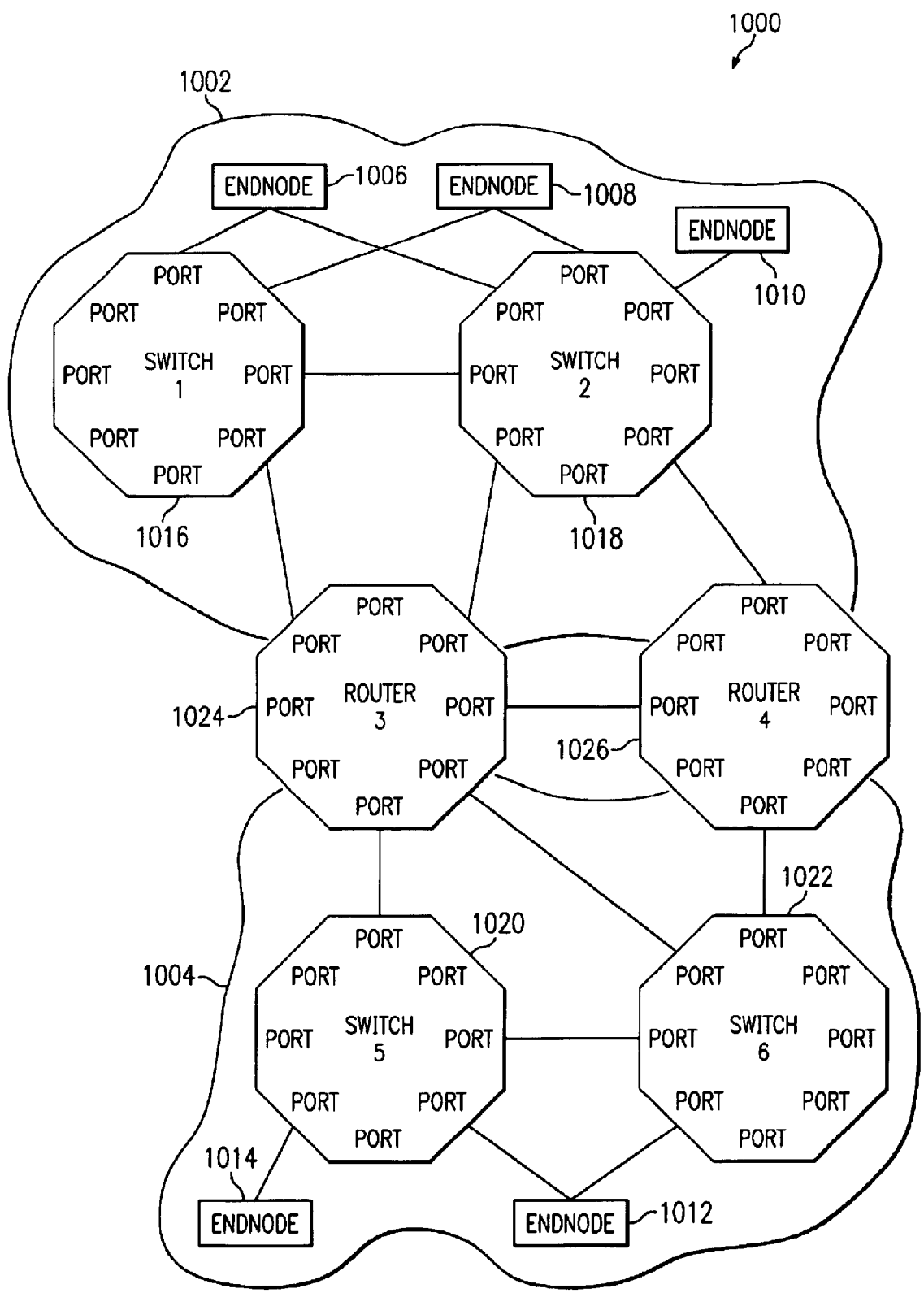
FIG. 10 is a diagram illustrating a portion of a distributed computing system in accordance with a preferred embodiment of the present invention in which the structure of SAN fabric subnets is illustrated.

A portion of a distributed computer system in accordance with a preferred embodiment of the present invention is illustrated in FIG. 10. Distributed computer system 1000 includes a subnet 1002 and a subnet 1004. Subnet 1002 includes host processor nodes 1006, 1008, and 1010. Subnet 1004 includes host processor nodes 1012 and 1014. Subnet 1002 includes switches 1016 and 1018. Subnet 1004 includes switches 1020 and 1022. Routers connect subnets. For example, subnet 1002 is connected to subnet 1004 with routers 1024 and 1026. In one example embodiment, a subnet has up to 216 end nodes, switches, and routers. A subnet is defined as a group of end nodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages. A switch within a subnet examines the DLID that is unique within the subnet to permit the switch to quickly and efficiently route incoming message packets. In one embodiment, the switch is a relatively simple circuit, and is typically implemented as a single integrated circuit. A subnet can have hundreds to thousands of end nodes formed by cascaded switches.

As illustrated in FIG. 10, for expansion to much larger systems, subnets are connected with routers, such as routers 1024 and 1026. The router interprets the IP destination ID (e.g., IPv6 destination ID) and routes the IP-like packet. An example embodiment of a switch is illustrated generally in FIG. 3B. Each I/O path on a switch or router has a port. Generally, a switch can route packets from one port to any other port on the same switch.

Within a subnet, such as subnet 1002 or subnet 1004, a path from a source port to a destination port is determined by the LID of the destination host channel adapter port. Between subnets, a path is determined by the IP address (e.g., IPv6 address) of the destination host channel adapter port and by the LID address of the router port which will be used to reach the destination's subnet.

In one embodiment, the paths used by the request packet and the request packet's corresponding positive acknowledgment (ACK) or negative acknowledgment (NAK) frame are not required to be symmetric. In one embodiment employing certain routing, switches select an output port based on the DLID. In one embodiment, a switch uses one set of routing decision criteria for all its input ports. In one example embodiment, the routing decision criteria are contained in one routing table. In an alternative embodiment, a switch employs a separate set of criteria for each input port.

A data transaction in the distributed computer system of the present invention is typically composed of several hardware and software steps. A client process data transport service can be a user-mode or a kernel-mode process. The client process accesses host channel adapter hardware through one or more queue pairs, such as the queue pairs illustrated in FIGS. 3A, 5, and 6. The client process calls an operating-system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, channel adapter hardware detects work queue element postings and accesses the work queue element. In this embodiment, the channel adapter hardware translates and validates the work queue element's virtual addresses and accesses the data.

An outgoing message is split into one or more data packets. In one embodiment, the channel adapter hardware adds a transport header and a network header to each packet. The transport header includes sequence numbers and other transport information. The network header includes routing information, such as the destination IP address and other network routing information. The link header contains the Destination Local Identifier (DLID) or other local routing information. The appropriate link header is always added to the packet. The appropriate global network header is added to a given packet if the destination endnode resides on a remote subnet.

If a reliable transport service is employed, when a request data packet reaches its destination endnode, acknowledgment data packets are used by the destination endnode to let the request data packet sender know the request data packet was validated and accepted at the destination. Acknowledgment data packets acknowledge one or more valid and accepted request data packets. The requester can have multiple outstanding request data packets before it receives any acknowledgments. In one embodiment, the number of multiple outstanding messages, i.e. Request data packets, is determined when a queue pair is created.

Figure 11:
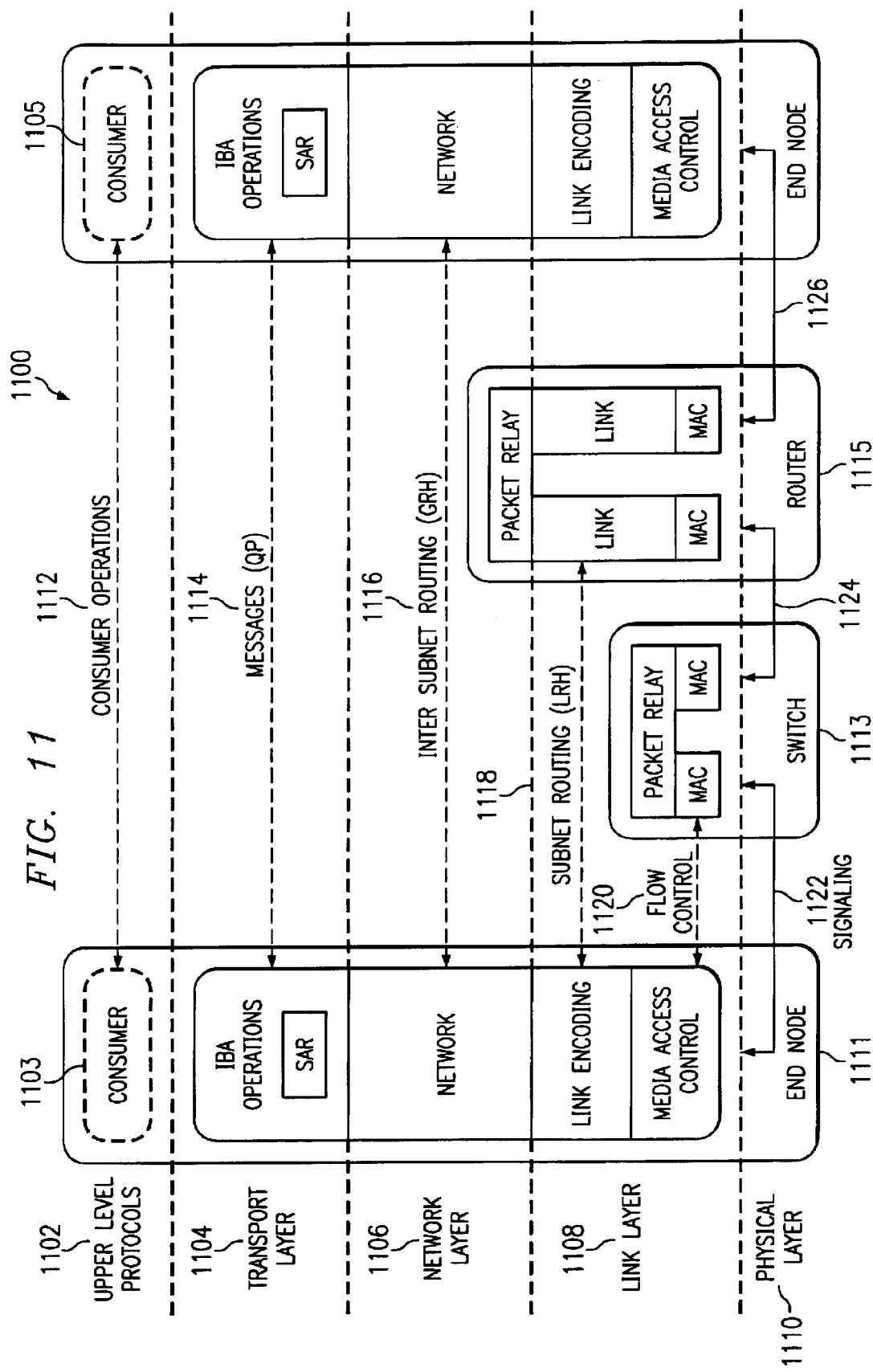
FIG. 11 is a diagram of a layered communication architecture used in a preferred embodiment of the present invention.

One embodiment of a layered architecture 1100 for implementing the present invention is generally illustrated in diagram form in FIG. 11. The layered architecture diagram of FIG. 11 shows the various layers of data communication paths, and organization of data and control information passed between layers.

Host channel adapter endnode protocol layers (employed by endnode 1111, for instance) include an upper level protocol 1102 defined by consumer 1103, a transport layer 1104; a network layer 1106, a link layer 1108, and a physical layer 1110. Switch layers (employed by switch 1113, for instance) include link layer 1108 and physical layer 1110. Router layers (employed by router 1115, for instance) include network layer 1106, link layer 1108, and physical layer 1110.

Layered architecture 1100 generally follows an outline of a classical communication stack. With respect to the protocol layers of end node 1111, for example, upper layer protocol 1102 employs verbs (1112) to create messages at transport layer 1104. Transport layer 1104 passes messages (1114) to network layer 1106. Network layer 1106 routes packets between network subnets (1116). Link layer 1108 routes packets within a network subnet (1118). Physical layer 1110 sends bits or groups of bits to the physical layers of other devices. Each of the layers is unaware of how the upper or lower layers perform their functionality.

Consumers 1103 and 1105 represent applications or processes that employ the other layers for communicating between end nodes. Transport layer 1104 provides end-to-end message movement. In one embodiment, the transport layer provides four types of transport services as described above which are reliable connection service; reliable datagram service; unreliable datagram service; and raw datagram service. Network layer 1106 performs packet routing through a subnet or multiple subnets to destination end nodes. Link layer 1108 performs flow-controlled, error checked, and prioritized packet delivery across links.

Physical layer 1110 performs technology-dependent bit transmission. Bits or groups of bits are passed between physical layers via links 1122, 1124, and 1126. Links can be implemented with printed circuit copper traces, copper cable, optical cable, or with other suitable links.

Figure 12A:
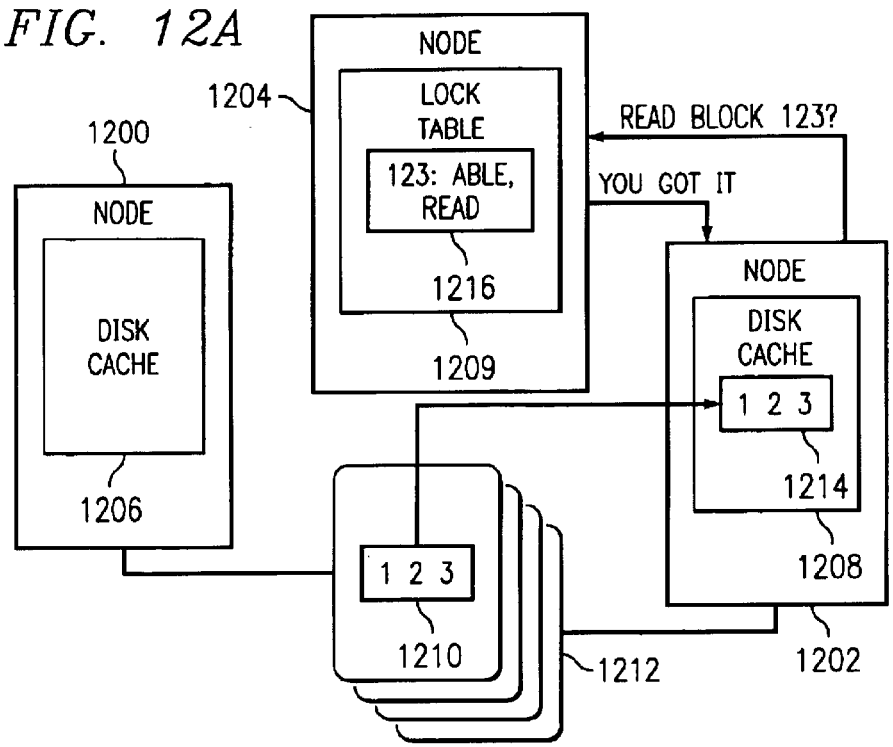
FIGS. 12A–12B are block diagrams illustrating components in a distributed buffer system in accordance with a preferred embodiment of the present invention.
Figure 12B:
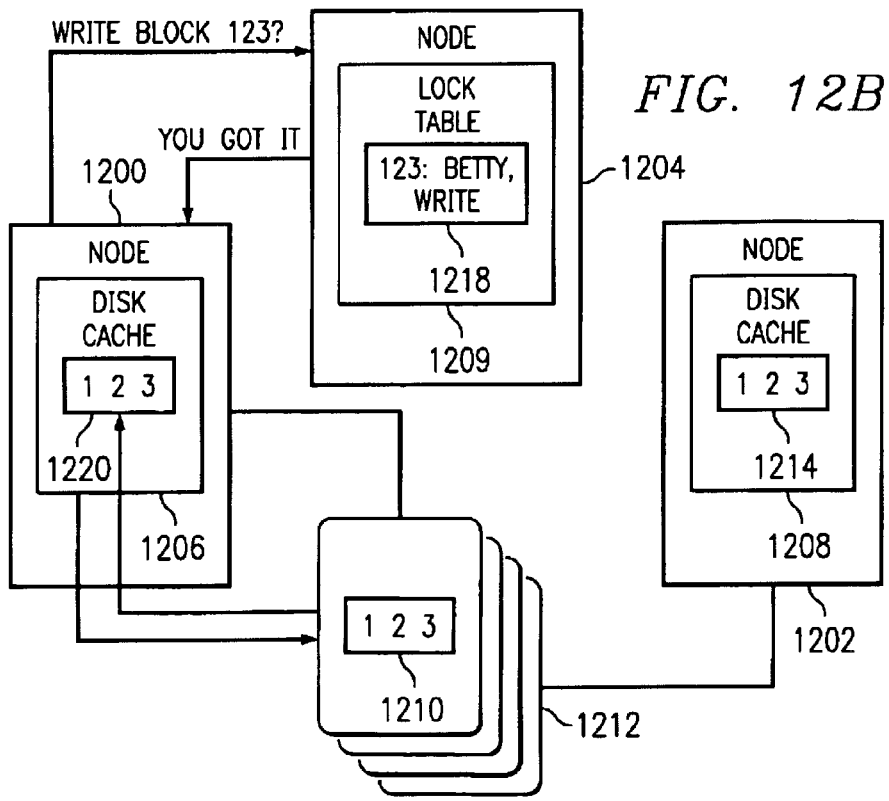

Turning next to FIGS. 12A–12B, block diagrams illustrating components in a distributed buffer system are depicted in accordance with a preferred embodiment of the present invention. In this example, two processing nodes, node 1200 and node 1202, are both caching data that is normally held on a disk subsystem as illustrated. Node 1200 contains disk cache 1206, and node 1202 contains disk cache 1208. These nodes may be implemented using a node, such as host processor node 102 in FIG. 1 or an end node, such as end node 900 in FIG. 9.

For clarity only, it is assumed that a third processing node, node 1204, holds in its memory lock table 1209 Lock table 1209 contains system-wide locks used to establish ownership of blocks of the data. The blocks of data may take many sizes such as a page. Of course, each block of data may be a different size from another block of data. Other mechanisms may be used to maintain the locks. For example, lock table 1209 may be distributed among node 1200 and node 1202. Assume node 1202 reads data block 1210 into its cache, disk cache 1208, from storage 1212 as copy 1214. At that time, as shown in FIG. 12A, node 1202 obtains a read lock for data block 1210 from node 1204. This read lock is shown as entry 1216 in lock table 1209. This read lock blocks access to data block 1210 by other nodes. Then, when node 1202 is finished with data block 1210, node 1202 releases the read lock in entry 1216 so other nodes may use data block 1210.

After node 1202 finishes using copy 1214 in its cache and releases the read lock on that block, no reason is present for immediately clearing this area in disk cache 1208. Such a deletion serves no purpose and merely uses computing resources to perform the clearing. The usual technique used instead is to just let copy 1214 stay there, without any change.

At some future point, the storage area used by copy 1214 may be needed to hold another data block, which also is referred to as a block. If the storage area is needed within disk cache 1208, then the data in copy 1214 is lost. However, node 1202 may know or predict that copy 1214 will be used again relatively soon by a program accessing this data. So it may avoid reusing that storage, instead preferentially reusing storage that holds other disk blocks that are less likely to be reused soon. For example, node 1202 may selectively choose the oldest (least recently used) block in its cache whenever a new area of storage is needed; this may result in copy 1214 remaining in node 1202's memory for a long time, depending on the rate of new block use and the size of the cache (how many blocks it holds). Such techniques have proven to be extremely valuable, since if copy 1214 is needed again it can just be reused in memory without getting it from disk (or another source). In fact, the intent of the design of algorithms used to pick a block in cache to use when a new one is needed is to maximize the chance that blocks such as copy 1214 will still be in node 1202's own disk cache when node 1202 wants to read it again. Many different strategies are used to do this, including dividing the cache into areas that have different reuse patterns, varying parameters of the algorithms used in response to access traffic, etc. So assume that the algorithm for picking blocks to reuse was successful: node 1202 wants to use data block 1210 again, and copy 1214 is still in node 1202's cache. As a necessary first step, node 1202 again gets a read lock for data block 1210 from node 1204.

At this point, node 1202 would like to reuse copy 1214 it has in its cache. On non-distributed systems, where there is only one node accessing the data, node 1202 could do so without a problem, and gain a significant performance advantage by doing so. However, multiple processing nodes are present in this system. As a result, node 1202 cannot know whether, while copy 1214 was lying unused in node 1202's cache, node 1200 wrote into data block 1210.

As illustrated in FIG. 12B, node 1200 may obtain a write lock for data block 1210 as illustrated entry 1218 in lock table 1209 for data block 1210 in storage 1212, read data block 1210 from storage 1212 to form copy 1220 in disk cache 1206, alter the contents of data block 1210, write the changed version of data block 1210 back to storage 1212, and release the write lock. All these steps may occur while copy 1214 remains in node 1202's cache unused. With this sequence of events, which includes node 1200's release of the write lock on data block 1210, no record of the fact that data block 1210 was changed is made. As a result, node 1202 has no way of knowing whether it can correctly reuse the cached copy of data block 1210, copy 1214, (with a large performance gain resulting) or must obtain a corrected copy from disk.

The usual solution to this problem is to maintain a directory in some node (or distributed across nodes) that tracks nodes that have copies of disk blocks at all times. Then, whenever a write is attempted on a block, the node managing the directory is informed first of the attempt. This node uses the directory to inform the other nodes with a copy that their copy is no longer any good, for example, by multicasting an invalid signal or message for a block; after that, the write is allowed to proceed. This solution requires resources to maintain the directory, but more importantly the message to each node holding the block will disrupt processing there, lowering efficiency; and it may be done with no result at all, since there is no guarantee that any of the nodes holding the block will in fact ever reuse the block.

One present solution avoids disrupting processing on the nodes holding cached blocks that must be invalidated is used in IBM's Parallel Simplex. This solution is based on proprietary hardware and on the assumption that a central node (called the coupling facility) holds all locks, processes all the invalidate signals, and also maintains a secondary cache of all blocks cached anywhere else. In contrast, the mechanism of the present invention does not require a secondary cache or a centralized locking facility, distributes the required invalidation processing among the nodes of the system, and uses nonproprietary hardware such as an InfiniBand SAN.

The description of the mechanism of the present invention, as described below, first sets forth the data structures used, the initialization performed in the system, and the operations of obtaining access to a data block which may be correct in a node's cache, freeing space in a node's cache, and additional operations needed before writing into a data block when first obtaining a write lock on it. It is assumed in this description that each node caching data from a given data set is identified by an index starting from 0. The actual address, such as an InfiniBand SAN Local Identifier (LID) used to communicate with that node is computed from that index in some fashion, for example, by establishing a table of LIDs that can be indexed by the node's index. Other means of association are possible.

In one embodiment of the present invention, the other data structures used are of two types. The first type is located in each node that caches data. The data structure is a set of locations reserved in the memory of that node, with one location being associated with each block of data caches. These locations are referred to as the validity flags for the data. These might be in a table associated with the cache, or embedded in other data associated with the cache, such as tables indicating which data block if any currently has a copy in which area of the cache.

In a second type of data structure, data locations are present that hold or are associated with system-wide locks. In these examples, one such data structure is allocated for each data block currently in use anywhere in the system. This data structure also is referred to as a lock table. This data structure also may be centralized in one node or may be distributed among many nodes using, for example, a hash function on the data block name to determine the node in which a particular block's lock data is held. Associated with each entry in the lock table is data identifying the node and the location in the node where the validity flag for a given block exists. There are as many entries there as there are nodes in the system, since each node holds at most one copy of a data block. The format of this table may vary widely.

Figure 13:
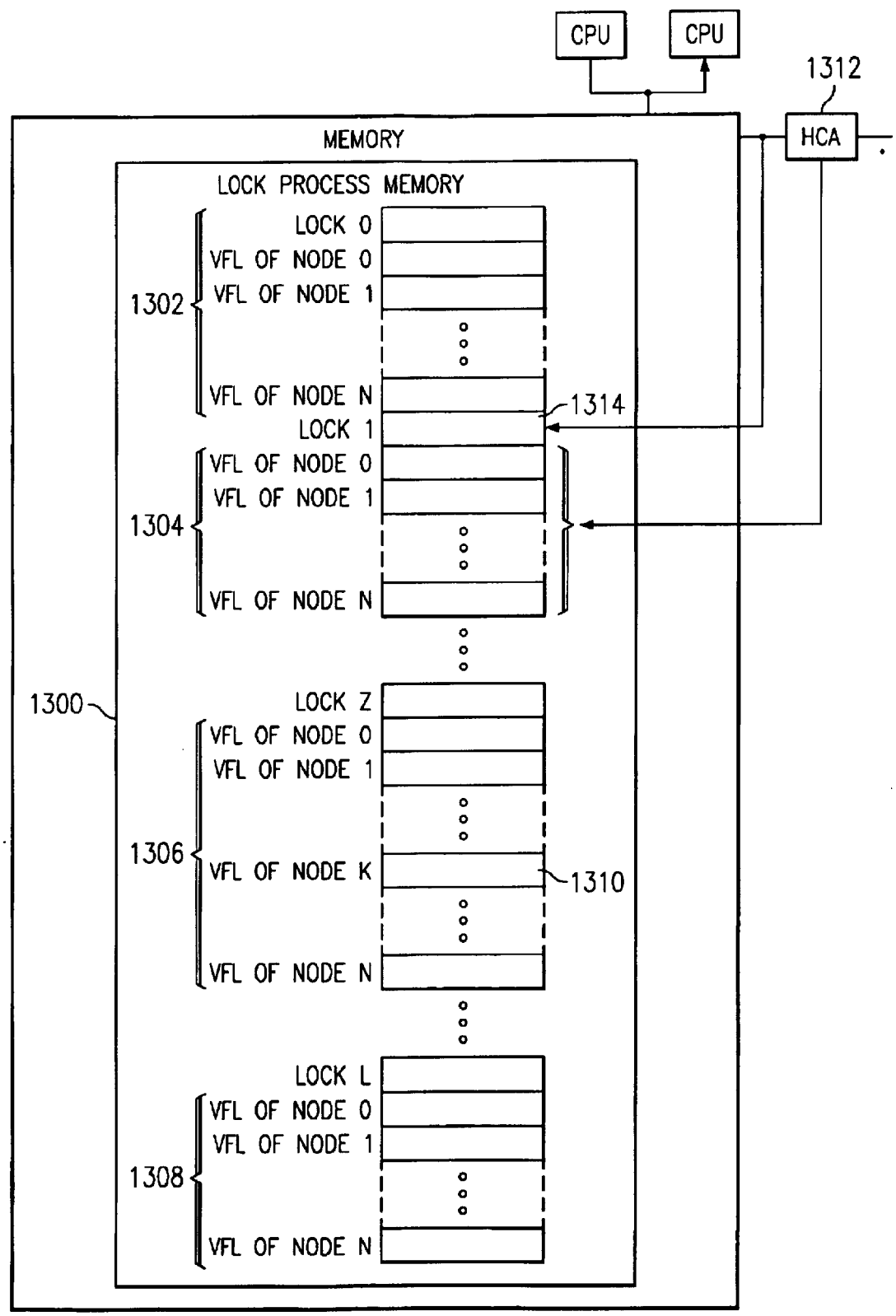
FIG. 13 is a diagram of a lock table in accordance with a preferred embodiment of the present invention.

Turning next to FIG. 13, a diagram of a lock table is depicted in accordance with a preferred embodiment of the present invention. Lock table 1300 is located within memory 1302 of a node. In this example, lock table 1300 is embedded with tables 1302, 1304, 1306, and 1308 in this example. In lock table 1300, each embedded table is shown after a lock location as an array N elements long in which N is the number of nodes in the system. Entry 1310 in that sub-array, for lock Z, is an example of a validity flag location: the memory address, in node whose index is K, of the validity flag for the block locked by lock Z in entry 1310.

Atomic operations on locks may be generated by HCA 1312. Additionally, HCA 1312 may initiate a read direct memory access (RDMA) to obtain validity flag location (VFL) data. In this example, HCA 1312 may obtain VFL data from table 1304. An operation on a lock table location may be performed on entry 1314.

Alternatively, instead of an array of locations, a bit vector identifying the node may be present. In this case, an array in the memory of the node itself is accessed by the algorithms to be described to find the location of the validity flag for a given block. Additional organizations also may exist. The validity flag locations must themselves be annotated in some way so the locations provide an indication of instances when the locations do not contain a valid location indicating that the associated block is not held in the associated node's cache at all. In the depicted example, this indication is made by storing in the validity flag location a distinguished value, such as 0 or all 1s in binary notation, that is understood not to designate a valid location. An alternative implementation is to use a separate vector of bits, one for each validity flag, each of these bits is in one state when the validity flag location is valid and is in another state when the validity flag is invalid.

Before any of the processes participating in caching the same set of data is started, as is normal practice, the facilities for holding and granting locks across multiple nodes are initialized. At any point during that initialization, but before it is complete, the validity flag locations are all initialized to indicate that their contents are invalid. As each process on a node participating in caching the same set of data is started, it must be initialized in the following way (steps in any order): (1) The node must be given the location of the lock table or equivalent structure in whatever node or nodes holds lock tables and serves as a base from which to find the validity flags. (2) The node must allocate validity flags for each data block location in its cache, and set them all to a value indicating "invalid data" (such as 0).

Figure 14:
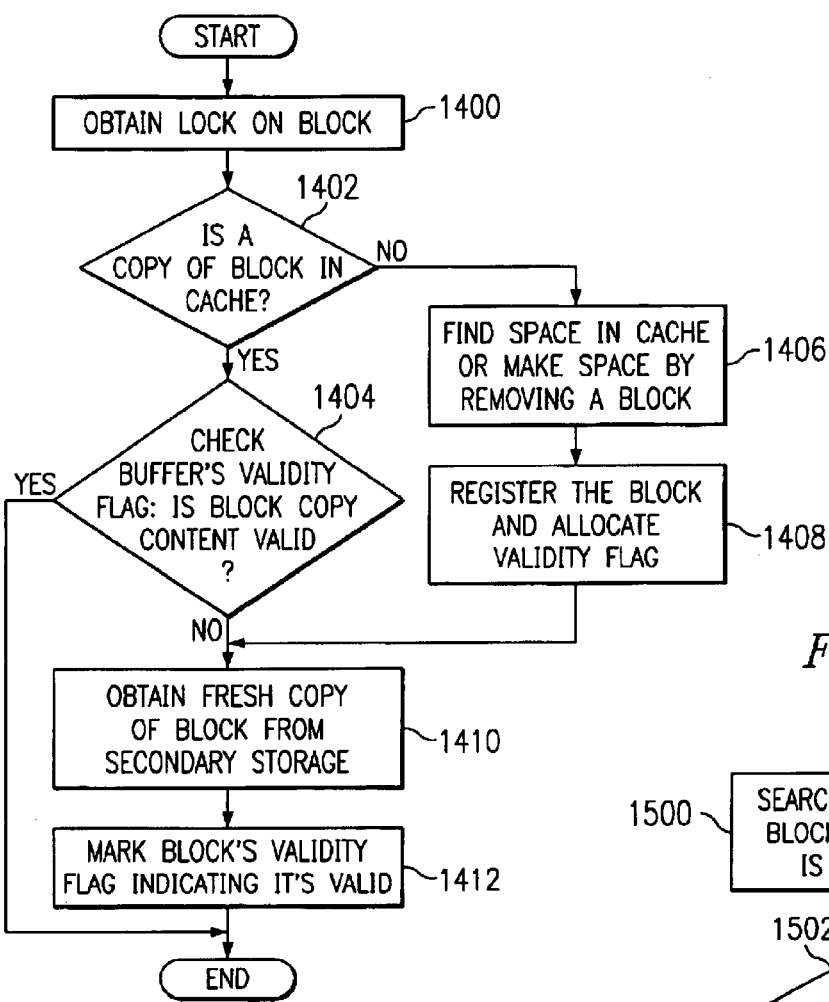
FIG. 14 is a flowchart of a process used for obtaining a data block in accordance with a preferred embodiment of the present invention.

With reference now to FIG. 14, a flowchart of a process used for obtaining a data block is depicted in accordance with a preferred embodiment of the present invention. The process illustrated in FIG. 14 may be implemented in a node, such as host node 102 in FIG. 1 or end node 900 in FIG. 9.

The process begins by obtaining a lock on a block (step 1400). The lock obtained is of the appropriate type depending on whether a read or write is to be performed on the block. The particular mechanism depends on the kind of locking protocol used in the system. For example, a read lock may be granted while other nodes are also holding read locks, but a write lock may be granted only if no other node is holding a read or write lock. This process may involve delay and waiting. If a write lock is required, additional processing is needed as described in a later subsection. A determination is made as to whether a copy of the block is present locally in a cache (step 1402). If a copy of the block is in the cache, the buffer's validity flag is checked and a determination is made as to whether the block copy contains valid content (step 1404). If the answer to this determination is yes, the process terminates.

With reference again to step 1402, if a copy of the block is not in a cache, a space is found or made in the cache by removing a block (step 1406). Space is freed locally in a cache within the node. The block is registered and the validity flag is allocated (step 1408). A fresh copy of the block is obtained from a secondary storage and is written into the local cache (step 1410). The block's validity flag is marked to indicate that the block is valid (step 1412) with the process terminating thereafter. This flag is set to have a location that corresponds to the location of this block within the cache in addition to being set as valid. Turning back to step 1404, if the buffer's validity flag is not valid, the process proceeds to step 1410 as described above.

The process described above performs registration in step 1408. This step involves setting the validity flag location associated with the node doing the processing and the block. This setting may be performed in the example data structure of FIG. 13 described above by computing the location in the lock table of the appropriate validity flag location (adding to the base address N times the lock number plus the node index); and having computed that location, perform a remote DMA operation to store the address of the validity flag into the table at that location.

Figure 15:
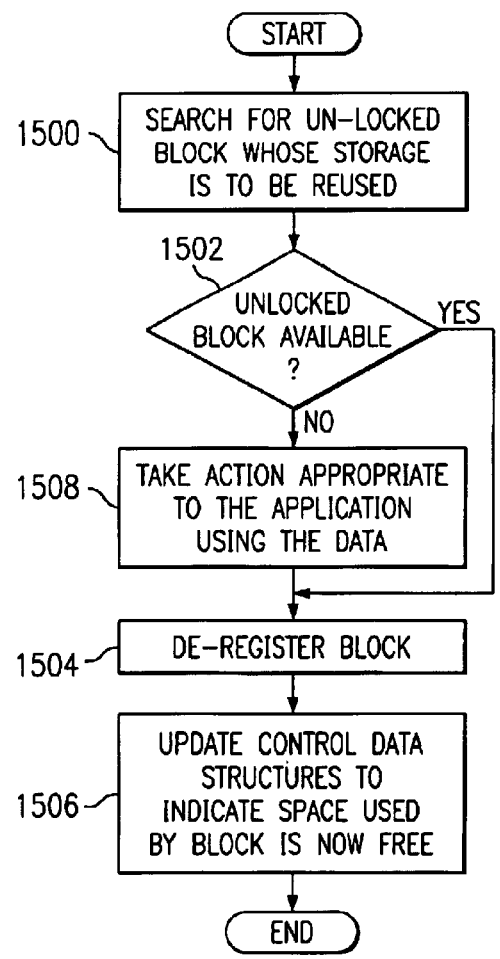
FIG. 15 is a flowchart of a process used for freeing space of a data block in a cache in accordance with a preferred embodiment of the present invention.

Turning next to FIG. 15, a flowchart of a process used for freeing space of a data block in a cache is depicted in accordance with a preferred embodiment of the present invention. The process illustrated in FIG. 15 may be implemented in a node, such as host node 102 in FIG. 1 or end node 900 in FIG. 9.

When a process wishes to free space in its cache, the process must first find a block in the cache that is currently not locked. Space may be freed, for example, to read in the data is a new block. If a block is locked, the data for this block is currently in use by some other operation and cannot be freed up to be overwritten with data from another block. If there are no blocks that are not locked, the action taken depends on criteria that may vary from case to case; for example, the operation requiring the free space may be aborted, or it may be suspended until unlocked blocks are available, or other actions may be taken.

The process begins by searching for an unlocked block whose storage area is to be reused (step 1500). A determination is then made as to whether an unlocked block is available (step 1502). From among the possible unlocked blocks, one unlocked block is selected by some criterion that may vary from case to case. For example, the process may associate with each block information indicating when the block was last used, and choose the least recently used one. Many other techniques are possible. If the unlocked block is available, the chosen block is de-registered (step 1504). The block is de-registered in step 1504 by setting its validity flag location invalid. In the depicted example, this step may be performed by computing the address of the validity flag location and using RDMA to write a 0 or other invalid address value in that location. Then, control data structures are updated to indicate the space used by the chosen block is now free (step 1506) with the process terminating thereafter.

Turning back to step 1502, if an unlocked block is unavailable, an action appropriate to the application is taken using the data (step 1508) with the process then proceeding to step 1504 as described above. For example, the operation requiring the free space may be aborted, or it may be suspended until unlocked blocks are available, or more space for blocks may be allocated, or other actions may be taken. In the example implementation shown in FIG. 15, an action is taken that results in an unlocked block being made available so the operation may continue.

Figure 16:
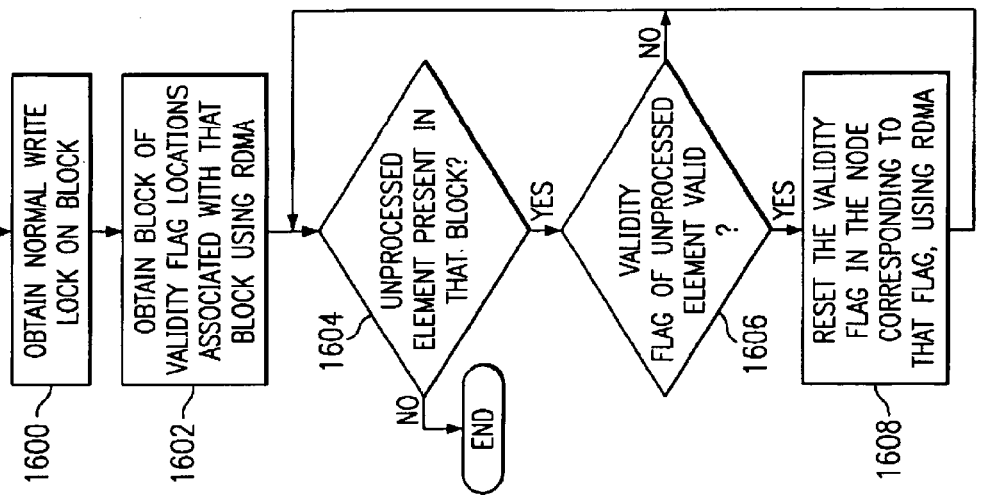
FIG. 16 is a flowchart of a process used for completion of obtaining write lock on a data block in accordance with a preferred embodiment of the present invention.

Turning next to FIG. 16, a flowchart of a process used for completion of obtaining write lock on a data block is depicted in accordance with a preferred embodiment of the present invention. The process illustrated in FIG. 16 may be implemented in a node, such as host node 102 in FIG. 1 or end node 900 in FIG. 9.

The process begins by obtaining a write lock on the data block (step 1600). As described previously, the manner in which the write lock is obtained depends on the locking protocol of the system and may involve delay until other nodes release read locks. Thereafter, a block of validity flag locations associated with the block is obtained using RDMA (step 1602). These locations form a set of elements for the block. A determination is made as to whether an unprocessed element is present in the block (step 1604). If an unprocessed element is present, a determination is made as to whether the validity flag for the unprocessed flag is valid (step 1606). If the validity flag is valid, the validity flag is reset in a node corresponding to the validity flag for the element using RDMA (step 1608) with the process then returning to step 1604 as described above.

Turning back to step 1606, if the validity flag is invalid, the process returns to step 1604 as described above. Referring back to step 1604, if an unprocessed element is not present, the process terminates.

The process may use remote DMA to the node holding the validity flag to set the validity flags to a state indicating that the block is no longer valid. Using the data structure of FIG. 13 described above, the list of nodes and validity flag locations may be obtained by a single remote DMA that reads the list of validity flag locations. The location of the list is determined as described previously. Then, for each element in the list, the process checks the location in the list. If it is valid, it performs the operation described above to reset the flag on that node; otherwise it continues checking the next element of the list. Either way, the validity flag in each node holding a cached copy of the data is reset without any involvement by the node holding that cached data, since this is done using a remote DMA operation that does not affect its current processing. As mentioned earlier, that the node is informed without being interrupted is one of the key features of this invention. Since each node must use the SAN to do remote operations such as remote DMA on any of the nodes participating, the Reliable Datagram facility of an InfiniBand SAN, if present, can be used for all of those communications; this will result in no decrease in speed, and a reduction in the resources required.

In many of the sections above in which a remote DMA is described, the atomic operation compare-and-swap of an InfiniBand SAN can be used when the prior content of the validity flag or the validity flag location is known. For example, when registering a block, the prior content of the validity flag location should contain the entry indicating it was invalid. This results in no loss of performance and insignificant additional resources used, and can provide valuable error-checking: If the content was not the expected one, something is clearly wrong, and the system can be halted or other action taken before the error propagates and causes corrupted data. To highlight the innovation in this invention and avoid unnecessary complexity, the discussion above was all written as if the unit of storage moved to and from disk and memory is the same unit locked, and the same unit that has to be tracked for correctness. For many uses of this technique, this may lead to thrashing due to "false sharing" behavior: only part of a unit read or written from storage was actually modified by a write, for example. Those skilled in the art will recognize that the techniques described here can also be used when the unit of data moved to and from storage, the unit locked, and the unit tracked for correctness have different sizes within reasonable limits.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a system that includes a plurality of nodes, each one of said plurality of nodes including a computer and a disk cache coupled to the computer, said system including multiple independent computers that are each coupled to a different disk cache, for managing cached data, the method comprising:

responsive to a first one of said computers in a first node initiating a read operation on a block of data, placing an indication on a directory of data blocks identifying the first one of said computers as containing a copy of the data block in a disk cache that is coupled to said first one of said computers, said disk cache being included in said first one of said plurality of nodes, including in said indication a location in the first one of said computers in which a flag associated with the copy of the data block is located, said flag indicating whether said copy of said data block that is located in said disk cache is valid;

each one of said computers that is coupled to a disk cache that includes a copy of said data block including a flag that indicates whether said copy of said data block that is stored in the disk cache in each one of said computers is valid; and responsive to initiating a write operation on the data block, sending a message to all others of said computers identified in the directory of data blocks as containing a copy of the data block to reset the flag included in said others of said computers such that the flag indicates that the data in the copy of the data block that is stored in a disk cache that is coupled to each one of said others of said computers is invalid without requiring any action by the others of said computers that received the message.

2. The method of claim 1, wherein the directory of data blocks is located in at least one of the computers.

3. The method of claim 1, wherein the data block is a page.

4. A method in a system for managing a plurality of disk caches of data, the system including a plurality of nodes of independent computers, each one of said plurality of nodes including one of said plurality of disk caches, the method comprising:

dedicating one of said independent computers for polling for request messages from other computers;

responsive to initiating a read operation to read data on a data block into one of said plurality of disk caches, posting an indication on a directory of data blocks identifying the read operation by identifying one of the computers that initiated the read operation; and responsive to initiating a write operation on the data block, sending a message to all of the other computers that the data block is invalid.

5. The method of claim 4 further comprising:

obtaining a lock on a data block by one of said computers included in one of said plurality of nodes;

determining whether a copy of the data block is stored within a local disk cache included in said one of said plurality of said nodes; and responsive to a copy of the data block not being stored within the local disk cache, checking a validity of the data block utilizing said directory.

6. The method of claim 4 further comprising:
providing a lock table, wherein the lock table contains data identifying a lock that is held on the data block and includes a location of a validity flag in each computer system in one of said plurality of nodes that includes one of said disk caches in which a copy of said data block is currently stored, each said validity flag in a computer system indicating whether the data block that is currently stored in said one of said plurality of disk caches is valid.

7. The method of claim 4, wherein the data block is a page.

8. The method of claim 4, wherein the message initiates an invalidation of the data block.

9. A method in a system that includes multiple independent computer systems, the method comprising:
identifying an operation to access data;
determining whether a copy of the data is stored locally in a disk cache in a node that includes said disk cache coupled to one of the computers;
responsive to the copy of the data being stored in said local disk cache, checking an indicator for the data to determine whether the copy of the data is valid;
responsive to the data being valid, accessing, by the one of the computers, the copy of the data;
responsive to the accessing being a write access, obtaining identification of each one of the computers that is coupled to a disk cache in which a copy of the data is currently stored to form a set of identified computers; and
setting indicators in the set of identified computers to indicate that a copy of the data that is stored in said disk cache of each one of the computers is invalid.

10. The method of claim 9 further comprising:
responsive to an absence of a copy of the data being stored in said local disk cache, copying the data into the local disk cache; and
setting one of said indicators to indicate that the data copied into the local disk cache is valid.

11. The method of claim 9, wherein the data is a page.

12. The method of claim 9, wherein the operation is read operation.

13. The method of claim 9, wherein the operation is a write operation.

14. A system comprising:
a plurality of nodes including multiple independent computers, each one of said plurality of nodes including a different disk cache coupled to each one of said computers;
each one of the computers including a processing unit connected to the bus system, wherein the processing unit executes a set of instructions to, place an indication on a directory of data blocks identifying one of the computers that includes said processor as containing a copy of a data block in a disk cache that is coupled to said one of said computers, said disk cache being included in one of said plurality of nodes, the indication including a location in the one of the computers in which a flag associated with the copy of the data block is located, the flag indicating whether the copy of the data block that is locked in the disk cache in the one of the plurality of nodes is valid in response to initiating a read operation on the block of data; and send a message to all others of the computers identified in the directory of data blocks as containing a copy of the data block to reset the flag included in the others of the computers such that the flag indicates that the data in the copy of the data block that is stored in a disk cache that is coupled to the others of the computers is invalid without requiring any action by the others of the computers that received the message in response to initiating a write operation on the data block.

15. A system that includes a plurality of nodes, each one of said plurality of nodes including computer and a disk cache coupled to said computer, said system including multiple independent computers, for managing cached data, the system comprising:
responsive to a first one or said computers in a first node initiating a read operation on a block of data, placing means placing an indication on a directory of data blocks identifying the first one of said computers as containing a copy of the data block in a disk cache that is coupled to said first one of said computers, said disk cache being included in said first one of said plurality of nodes, including in said indication a location in the first one of said computers in which a flag associated with the copy of the data block is located, said flag indicating whether said copy of said data block that is located in said disk cache is valid;
each one of said computers that is coupled to a disk cache that includes a copy of said data block including a flag that indicates whether said copy of said data block that is stored in the disk cache in each one of said computers is valid; and
responsive to initiating a write operation on the data block, sending means for sending a message to all others of said computers identified in the directory of data blocks as containing a copy of the data block to reset the flag included in said others of said computers such that the flag indicates that the data in the copy of the data block that is stored in a disk cache that is coupled to each one of said others of said computers is invalid without requiring any action by the others of said computers that received the message.

16. The system of claim 15, wherein the directory of data blocks is located in at least one of the computers.

17. The system of claim 15, wherein the data block is a page.

18. A system for managing a plurality of disk caches of data, the system including a plurality of nodes of independent computers, each one of said plurality of nodes including one of said computers and one of said plurality of disk caches coupled to said one of said computers, the system comprising:
dedicating means for dedicating one of said independent computers for polling for request messages from other computers;
responsive to initiating a read operation to read data on a data block into one of said plurality of disk caches, posting means for posting an indication on a directory of data blocks identifying the read operation by identifying one of the computers that initiated the read operation; and
responsive to initiating a write operation on the data block, sending means for sending a message to all of the other computers that the data block is invalid.

19. The system of claim 18 further comprising:
obtaining means for obtaining a lock on a data block by one of said computers including in one of said plurality of nodes;
determining means for determining whether a copy of the data block is stored within a local disk cache included in said one of said plurality of said nodes; and checking means, responsive to a copy of the data block not being stored within the local disk cache, for checking a validity of the data block utilizing said directory.

20. The data processing system of claim 18 further comprising:
providing a lock table, wherein the lock table contains data identifying a lock that is held on the data block and includes a location of a validity flag in each computer system in one of said plurality of nodes that includes one of said disk caches in which a copy of said data block is currently stored, each said validity flag in a computer system indicating whether the data block that is currently stored in said one of said plurality of disk caches is valid.

21. The data processing system of claim 18, wherein the data block is a page.

22. The data processing system of claim 18, wherein the message initiates an invalidation of the data block.

23. A system that includes multiple independent computer systems for managing data, the system comprising:
identifying means for identifying operation to access data;
determining means for determining whether a copy of the data is stored locally in a disk cache in a node that includes said disk cache coupled to one of the computers;
responsive to the copy of the data being stored in said local disk cache, checking means for checking an indicator for the data to determine whether the copy of the data is valid;
responsive to the data being valid, accessing means for accessing, by the one of the computers, the copy of the data;
responsive to the accessing being a write access, obtaining means for obtaining identification of each one of the computers that is coupled to a disk cache in which a copy of the data is currently stored to form a set of identified computers; and
setting means for setting indicators in the set of identified computers to indicate that a copy of the data that is stored in said disk cache of each one of the computers is invalid.

24. The data processing system of claim 23 further comprising:
copying means, responsive to an absence of a copy of the data being stored in a disk cache locally within the one of the computers, for copying the data into the local disk cache; and
setting means for setting one of said indicators to indicate that the data copied into the local disk cache is valid.

25. The data processing system of claim 23, wherein the data is a page.

26. The data processing system of claim 23, wherein the operation is read operation.

27. The data processing system of claim 23, wherein the operation is a write operation.

28. A computer program product in a computer readable medium for managing a plurality of caches data, the computer program product comprising:
a system that includes a plurality of nodes, each one of said plurality of nodes including a computer and a disk cache, said system including multiple independent computers;
responsive to a first one of said computers in a first node initiating a read operation on a block of data, instruction means for placing an indication on a directory of data blocks identifying the first one of said computers as containing a copy of the data block in a disk cache that is coupled to said first one of said computers, said disk cache being included in said first one of said plurality of nodes, including in said indication a location in the first one of said computers in which a flag associated the copy of the data block is located, said flag indicating whether said copy of said data block that is located in said disk cache is valid;
each one of said computers that is coupled to a disk cache that includes a copy of said data block including a flag that indicates whether said copy of said data block that is stored in the disk cache in each one of said computers is valid; and
responsive to initiating a write operation on the data block, instructions for sending a message to all others of said computers identified in the directory of data blocks as containing a copy of the data block to reset the flag included in said others of said computers such that the flag indicates that the data in the copy of the data block that is stored in a disk cache that is coupled to each one of said others of said computers is invalid without requiring any action by the others of said computers that received the message.

29. A computer program product in a computer readable medium for managing a plurality of disk caches of data, wherein the data processing system includes a plurality of processors, the computer program product comprising:
the system including a plurality of nodes of independent computers, each one of said plurality of nodes including one of said plurality of disk caches;
instructions for dedicating one of said independent computers for polling for request messages from other computers;
responsive to initiating read operation to read data on a data block into one of said plurality of disk caches, instructions for posting an indication on a directory of data blocks identifying the road operation by identifying one of the computers that initiated the road operation; and
responsive to initiating a write operation on the data block, instructions for sending a message to all of the other computers that the data block is invalid.

30. A computer program product in a computer readable medium for managing data, the computer program product comprising:
a system that includes multiple independent computer systems;
instructors for identifying an operation to access data;
instructions for determining whether a copy of the data is stored locally in a disk cache in a node that includes said disk cache coupled to one of the computers;
responsive to the copy of the data being stored in said local disk cache, instructions for checking an indicator for the data to determine whether the copy of the data is valid;
responsive to the data being valid, instructions for accessing, by the one of the computers, the copy of the data;
responsive to the accessing being a write access, instructions for obtaining identification of each one of the computers that is coupled to a disk cache in which a copy of the data is currently stored to form a set of identified computers; and
instructions for setting indicators in the set of identified computers to indicate that a copy of the data that is stored in said disk cache of each one of the computers is invalid.

* * * * *

UNITED STATES PATENT AND TRADEMARK OFFICE
CERTIFICATE OF CORRECTION

PATENT NO. : 6,832,297 B2
DATED : December 14, 2004
INVENTOR(S) : Pfister et al.

It is certified that error appears in the above-identified patent and that said Letters Patent is hereby corrected as shown below:

Column 23,
Line 16, after "systems" insert -- for managing data --.

Column 24,
Line 9, after "including" insert -- a --.
Line 13, after "one" delete "or" and insert -- of --.
Line 15, after "means" insert -- for --.

Column 25,
Line 21, after "means for identifying" insert -- an --.

Column 26,
Line 33, after "initiating" insert -- a --.
Line 36, after "the" delete "road" and insert -- read --.
Line 37, after "initiated the" delete "road" and insert -- read --.
Line 47, before "for identifying" delete "instructors" and insert -- instructions --.

Signed and Sealed this

Eighteenth Day of April, 2006

JON W. DUDAS
*Director of the United States Patent and Trademark Office*